US008142553B2

(12) United States Patent
Tan et al.

(10) Patent No.: US 8,142,553 B2
(45) Date of Patent: Mar. 27, 2012

(54) AIR CLEANER SCAVENGE KIT

(75) Inventors: Xiaoming Tan, Apex, NC (US); Mehdi M. Daragheh, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 261 days.

(21) Appl. No.: 12/577,813

(22) Filed: Oct. 13, 2009

(65) Prior Publication Data

US 2011/0083635 A1 Apr. 14, 2011

(51) Int. Cl.
*B01D 46/00* (2006.01)

(52) U.S. Cl. ......... 95/279; 55/385.3; 55/302; 123/198 E

(58) Field of Classification Search ................. 55/385.3, 55/385.1, 414, DIG. 28; 123/54.4, 198 E, 123/593; 180/219, 225
See application file for complete search history.

(56) References Cited

U.S. PATENT DOCUMENTS 4,697,668 A 10/1987 Barker
4,917,202 A 4/1990 Glover, Jr. et al.
4,946,482 A 8/1990 Tamba et al.
5,167,209 A 12/1992 Dufern et al.
6,258,144 B1 * 7/2001 Huang ......................... 55/385.3
6,290,016 B1 9/2001 Umeoka
6,295,953 B1 10/2001 Ohsawa et al.
6,537,338 B2 * 3/2003 Inoue et al. .................. 55/385.3
6,622,807 B2 9/2003 Preiss
6,745,860 B2 6/2004 Yabe
6,878,178 B2 4/2005 Schulze et al.
2003/0154862 A1 8/2003 Schulze et al.
2003/0182910 A1 10/2003 Pikesh et al.
2005/0210843 A1 * 9/2005 Bajza et al. .................. 55/385.3
2008/0289305 A1 * 11/2008 Girondi ........................ 55/385.3

* cited by examiner

*Primary Examiner* — Duane Smith
*Assistant Examiner* — Minh-Chau Pham
(74) *Attorney, Agent, or Firm* — William A. Beckman

(57) ABSTRACT

The present disclosure provides a method and apparatus for removing debris from an air cleaner of an internal combustion engine. The method includes receiving a flow of air from a source of air flow associated with an internal combustion engine at a first end portion of a conduit and passing the flow of air towards a second end portion of the conduit. The method also includes passing the flow of air into a scavenging conduit of the air cleaner towards an exhaust end of the scavenging conduit and creating a suction pressure at an end of the scavenging conduit connected to the air cleaner. The suction pressure results in a drawing in of the debris from the air cleaner.

13 Claims, 2 Drawing Sheets

AIR CLEANER SCAVENGE KIT

TECHNICAL FIELD

The present disclosure generally relates to an air cleaner of an internal combustion engine and more particularly, to a method and apparatus for removing debris from the air cleaner.

BACKGROUND

Typical internal combustion engines require an inflow of ambient air for supporting one or more functional aspects of the engine assembly. The ambient air generally contains dust particles, grit and the like that may damage the engine assembly. Therefore, it is desirable to have an inflow of air that is substantially free of airborne particulates, such as fine dust, dirt, sand, crop material, etc. (debris).

Typically, air cleaners and/or filters are utilized to remove fine dust, dirt, sand, crop material, etc., from drawn in ambient air. An air cleaner performs the task of removing the airborne particulates from the ambient air entering the internal combustion engine such that the particulates do not travel into engine and cause significant wear and damage. Over a period of time, the air cleaner can become clogged with the entrapped dirt and grit particles. Therefore, air cleaners require periodic cleaning or replacement. Because air cleaners are expensive, however, frequent replacement is costly and undesirable. This is especially true when the machine is operated in a dirty or dusty environment, such as mining or other earth working environments.

To aid in removing accumulations of debris from the air cleaner, typically a scavenging conduit is provided. The scavenging conduit is connected to the air cleaner at a first end and is kept open to the environment at the other end. The accumulations in the air cleaner fall into the scavenging conduit and finally escape from the open/exhaust end under the force of gravity. To aid in removing accumulations of the debris from the air cleaner, generally a muffler is utilized. One such example is shown in U.S. Pat. No. 4,697,668 issued on Oct. 6, 1987 and assigned to Nelson Industries Inc., wherein a suction pressure is generated in the scavenging conduit, of the air cleaner, by a cavity provided in the scavenging conduit and connected to exhaust mufflers of the engine assembly. The arrangement disclosed is costly since the exhaust muffler has to be modified. Further, the cavity arrangement can be susceptible to being filled with the debris drawn from the air cleaner since the cavity has a narrow cross-section. Furthermore, the disclosed arrangement fails to provide effective suction pressure. In other disclosed examples, a suction fan is connected to the scavenging conduit to effectively remove the dirt particles accumulated in the air cleaner. However, such an arrangement adds to the cost and bulk of the engine envelope. Hence, there remains a need to provide a simple arrangement for effectively removing debris accumulated in the air cleaner.

The present disclosure is directed to mitigating or overcoming one or more of the problems as set forth above.

SUMMARY

One aspect of the present disclosure provides an air cleaner scavenging kit for an engine assembly. The kit includes a conduit disposed proximate to an air-generating component of an internal combustion engine at a first end portion of the conduit. The conduit is connected to a scavenging conduit of an air cleaner at a second end portion of the conduit. The conduit is disposed to receive a stream of air from the air-generating component and to direct the stream of air towards an exhaust end of the scavenging conduit.

In another aspect, a system for removing debris from an air cleaner of an internal combustion engine is disclosed. The system includes a scavenging conduit having a first end portion connected to an air cleaner and an exhaust end spaced from the first end portion. The system also includes a conduit disposed between a source of air and the scavenging conduit, the conduit being positioned to guide a stream of air from the source of air into the scavenging conduit. The system also includes a nozzle located at an end portion of the conduit and disposed in the scavenging conduit. The nozzle directs the air towards the exhaust end of the scavenging conduit, the air generating a suction pressure at the first end portion of the scavenging conduit connected to the air cleaner.

In yet another aspect, the present disclosure provides a method for removing debris from an air cleaner of an engine assembly. The method includes routing a stream of air from an air-generating component of the engine assembly into a scavenging conduit coupled to the air cleaner. The method includes directing the stream of air towards an exhaust end of the scavenging conduit. The method also includes the step of generating a suction pressure in a portion of the scavenging conduit proximate to the air cleaner, the suction pressure causing a drawing of the debris from the air cleaner.

Other details and advantages of the disclosure will become apparent by reference to the following description and illustrative drawings of certain present embodiments thereof and certain present preferred methods of practicing the same proceeds.

BRIEF DESCRIPTION OF THE DRAWINGS

A more complete appreciation of this disclosure will be understood by reference to the following detailed description when considered in conjunction with the accompanying drawings, wherein.

DETAILED DESCRIPTION

Figure 1:
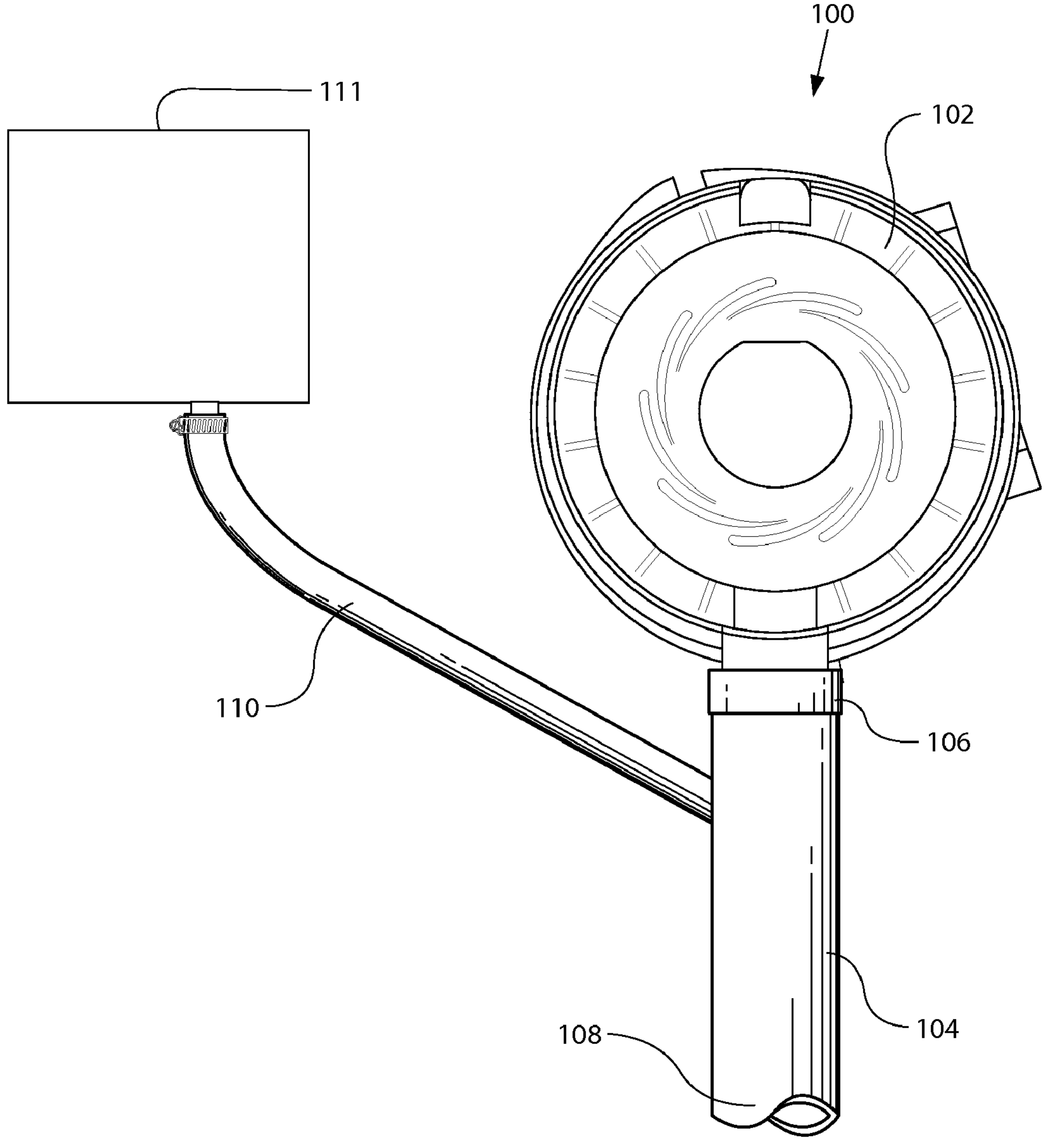
FIG. 1 is a diagrammatic view of an engine assembly with an air cleaner consistent with the present disclosure.

FIG. 1 illustrates an arrangement 100 for removing debris out of a conventional air cleaner 102 of an engine assembly according to an embodiment of the present disclosure. The disclosed arrangement 100 includes an air cleaner 102 having a scavenging conduit 104. The scavenging conduit 104 is connected to the air cleaner 102 at one end 106 for receiving debris that were separated from the incoming ambient air by the air cleaner 102. The other end, or the exhaust end 108, of the scavenging conduit 104 is generally left open to the environment for discharging the accumulated debris. A duct 110, such as a pipe or blow pipe, is made up of a material such as plastic, rubber, or metal. Duct 110 is disposed proximate to an air-generating component of the engine assembly at first end. According to an embodiment, the air-generating component may be a radiator fan 111 of the engine assembly. Radiator fan 111 or a similar air-generating component is not required, however, and duct 110 may alternately be exposed to open air.

Figure 2:
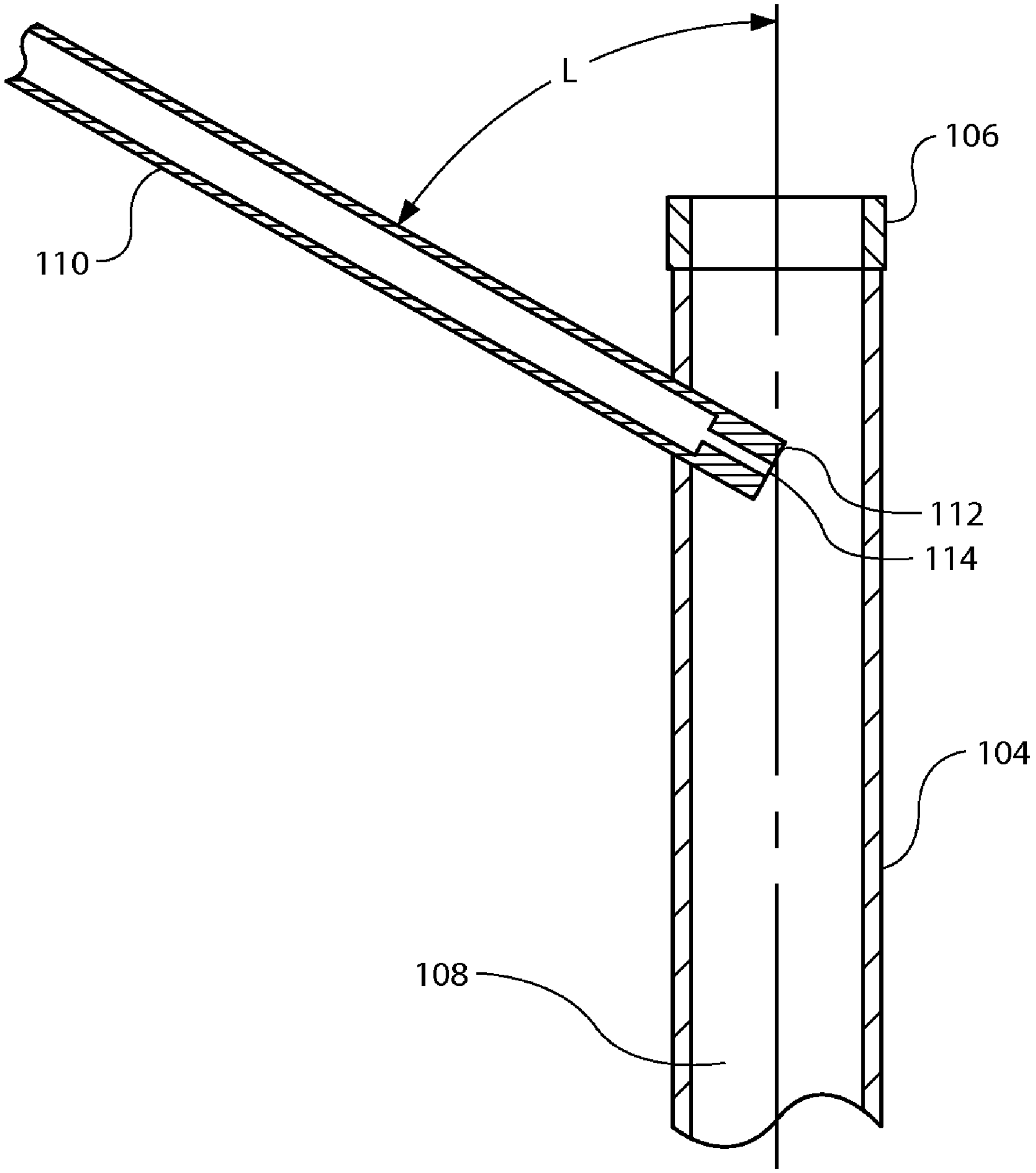
FIG. 2 is a diagrammatic side view of an air cleaner according to an aspect of the present disclosure.

FIG. 2 shows an air cleaner according to an aspect of the present disclosure. Duct 110 on scavenging conduit 104 has a second end 112 arranged to open into the scavenging conduit 104. The second end 112 of the duct 110 is so located to blow air towards the exhaust end 108 of the scavenging conduit 104. According to one embodiment, the second end 112 of the duct 110 is located in the middle of the both the ends of the scavenging conduit 104. In yet another embodiment, the duct 110 is located nearer to the end 106 of the scavenging conduit 104, connected to the air cleaner 102.

The second end 112 of the duct 110 may be oriented at an acute angle, angle "L" shown in FIG. 2, with respect to the lateral wall of the scavenging conduit 104 and tilted towards the exhaust end. In one exemplary embodiment, the angle is selected from a range lying between about 30 degrees to about 80 degrees with respect to a longitudinal axis of the scavenging conduit, the duct being at an obtuse angle relative to the exhaust end 108. This is preferred but not required, however. The first end of the duct 110 diverts a stream of air from the air-generating component. The diverted air is introduced at a high velocity into the scavenging conduit 104 through the second end 112 of the duct 110, such that it blows towards the exhaust end 108 of the scavenging conduit 104. The high velocity air generates a suction pressure near the end 106 of the scavenging conduit 104, connected to the air cleaner 102. The suction pressure results in the debris to be pulled out of the air cleaner 102. The debris is further pushed out of the scavenging conduit 104 with the stream of air that blows out of the scavenging conduit 104. In one embodiment, a nozzle 114 is configured at the second end 112 of the duct 110. The nozzle 114 is so located to blow air at a high velocity in the scavenging conduit 104 towards the exhaust end 108 of the scavenging conduit 104. In yet another embodiment, the duct 110 may be a blow pipe having a nozzle 114. Nozzle 114 may create a Venturi effect to generate an effective suction pressure between second end 112 and end 106.

INDUSTRIAL APPLICABILITY

The operation of the present disclosure is best described in relation to its use in machines operating in a dirty or dusty environment, particularly those machines performing farming, digging or loading functions, such as, excavators, backhoe loaders, skids steel loaders, wheel loaders, track-type tracers, and front shovels, etc.

An air cleaner is an important component of an engine assembly. The debris extracted by the air cleaner from the inhaled air is required to be regularly removed from the air cleaner for efficient functioning of the air cleaner. Disclosed arrangement 100 as shown in FIG. 1 provides an arrangement for efficiently removing debris collected in the air cleaner 102 by generating a suction pressure in the scavenging conduit 104. The suction pressure is generated, by blowing a jet of air in the scavenging conduit 104, towards the exhaust end 108 of the scavenging conduit 104. The jet of air results in generation of a suction pressure near the end 106 of the scavenging conduit 104, connected to the air cleaner 102. The debris pulled from the air cleaner 102 is further pushed out of the scavenging conduit 104 with the air escaping from the exhaust end 108 thereby keeping the air cleaner 102 free of debris. The air supplied to the scavenging conduit 104 can be drawn from any air-generating component (not shown) of the engine assembly such as but not limited to radiator fan. Thus, the disclosed arrangement 100 can be installed in conventional engine assemblies without any major modifications and results in effective removal of debris from the scavenging conduit of the air cleaners.

While certain present preferred embodiments of the disclosure and certain preferred methods of practicing the same have been illustrated and described herein, it is to be understood that the disclosure is not limited thereto, but may be otherwise variously embodied and practiced within the scope of the following claims.

What is claimed is:

1. An engine assembly comprising:

an air generating component that includes a radiator fan;

an air cleaner positioned to filter out debris carried by ambient incoming air prior to entry into an engine;

a scavenging conduit attached to the air cleaner and including a first end positioned to receive the debris from the air cleaner, and an exhaust end opening to an environment outside the engine for discharging the debris to the environment;

a duct extending between the air generating component and the scavenging conduit, and a second end of the duct opening into the scavenging conduit in a direction and at a location between the first end and the exhaust end to blow air from the air generating component toward the exhaust end of the scavenging conduit; and wherein the blow air generates suction pressure at the first end of the scavenging conduit to pull the debris out of the air cleaner and push the debris out of the exhaust end into the environment.

2. The engine assembly of claim 1 wherein the second end of the duct is nearer the first end of the scavenging conduit than the exhaust end of the scavenging conduit.

3. The engine assembly of claim 2 wherein the duct is oriented at an acute angle with respect to the scavenging conduit such that the duct is tilted toward the exhaust end.

4. The engine assembly of claim 3 wherein the acute angle is between 30 and 80 degrees.

5. The engine assembly of claim 4 wherein the second end of the duct is configured as a nozzle so that the blow air enters the scavenging conduit at high velocity.

6. The engine assembly of claim 1 wherein the duct is oriented at an acute angle with respect to the scavenging conduit such that the duct is tilted toward the exhaust end.

7. The engine assembly of claim 6 wherein the acute angle is between 30 and 80 degrees.

8. The engine assembly of claim 7 wherein the second end of the duct is configured as a nozzle so that the blow air enters the scavenging conduit at high velocity.

9. The engine assembly of claim 1 wherein the second end of the duct is configured as a nozzle so that the blow air enters the scavenging conduit at high velocity.

10. The engine assembly of claim 9 wherein the second end of the duct is nearer the first end of the scavenging conduit than the exhaust end of the scavenging conduit.

11. A method of operating an engine assembly, comprising the steps of:

filtering out debris from ambient air with an air cleaner prior to entry into an engine;

positioning a first end of a scavenging conduit to receive the debris from the air cleaner;

discharging the debris through an exhaust end of the scavenging conduit into an environment outside the engine;

generating suction pressure at the first end of the scavenging conduit to pull the debris out of the air cleaner and into the scavenging conduit;

pushing the debris toward the exhaust end of the scavenging conduit with blow air supplied through a duct that opens into the scavenging conduit; and generating the blow air with an air generating component that includes a radiator fan.

12. The method of claim 11 wherein the generating and pushing steps include orienting a second end of the duct at an acute angle tilted toward the exhaust end of the scavenging conduit.

13. The method of claim 12 wherein the generating and pushing steps further includes configuring the second end of the duct as a nozzle to deliver the blow air to the scavenging conduit at a high velocity.

* * * * *